United States Patent [19]
Marcus

[11] 3,819,314
[45] June 25, 1974

[54] LINEAR TRANSFER INJECTION BLOW MOLDING

[76] Inventor: Paul Marcus, 85 Pascack Rd., Pearl River, N.Y. 10965

[22] Filed: May 31, 1972

[21] Appl. No.: 258,244

[52] U.S. Cl. 425/249, 425/DIG. 209, 425/DIG. 213
[51] Int. Cl. .......................................... B29d 23/03
[58] Field of Search ............ 425/249, 242 B, 326 B, 425/324 B, 326 BJ, DIG. 203, DIG. 213, 387 B

[56] References Cited
UNITED STATES PATENTS

| | | | |
|---|---|---|---|
| 3,525,123 | 8/1970 | Cines et al. | 425/DIG. 203 |
| 3,562,372 | 2/1971 | Schjeldahl | 425/DIG. 203 |
| 3,594,862 | 7/1971 | Seefluth | 425/DIG. 208 |
| 3,597,516 | 8/1971 | Harwood | 425/326 B |
| 3,699,199 | 10/1972 | MacDuff | 425/326 B |

*Primary Examiner*—Richard B. Lazarus
*Attorney, Agent, or Firm*—Kane, Dalsimer, Kane, Sullivan and Kurucz

[57] ABSTRACT

An injection blow molding machine for molding plastic receptacles is provided with a clamping plate on which is mounted a parison mold, a pair of split blow molds, one on each side of the parison mold and in line therewith, together with a pair of receptacle ejection or removing stations similarly arranged and in an in-line relationship. A second indexing plate is arranged in space relationship to the clamping plate and on which four in-lined core rod assemblies are mounted. The indexing plate is reciprocal towards and away from the clamping plate; and, at the same time, the indexing plate is reciprocal laterally in a plane parallel to the clamping plate. As a result of this relative linear motion, the two inner core rod assemblies are adapted to be sequentially coupled with the parison mold in forming the parison. This parison is adapted to be transferred while on the core rod assembly to a blow mold while the other core rod assembly of the central pair is then coupled with the parison mold. A split neck mold may form part of the inner pair of core rod assemblies for purposes of forming a threaded neck on the parison. The parison transferred to the blow mold is blown into the selected configuration against the cavity walls and the plastic is oriented for purposes of maintaining this configuration. When this orientation has been accomplished, the two inner core rod assemblies are reciprocated back to their original position at which the parison on the other core rod assembly is transferred to the other blow mold while the core rod associated with the blown parison is stripped therefrom and returned to the injection mold. During this lateral reciprocation, one of the two outer core rod assemblies is coupled with the blown plastic parison. Cooling air is passed through this core rod assembly to cool the blown parison. The introduced cooling air is adapted to bleed between the neck opening and the associated core rod which is preferably formed of relatively soft material. The other core rod of relatively soft material will have reciprocated from its associated blow mold to the neighboring ejection station. At this station, the cooled blown parison forming the finished receptacle will be removed from this core rod and transferred to the selected packaging station.

15 Claims, 7 Drawing Figures

FIG. 3
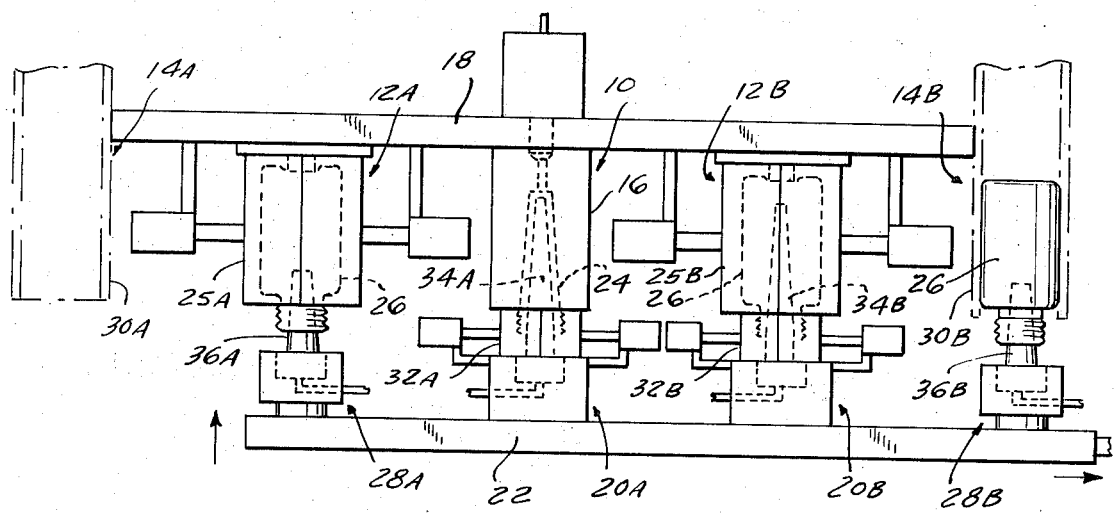
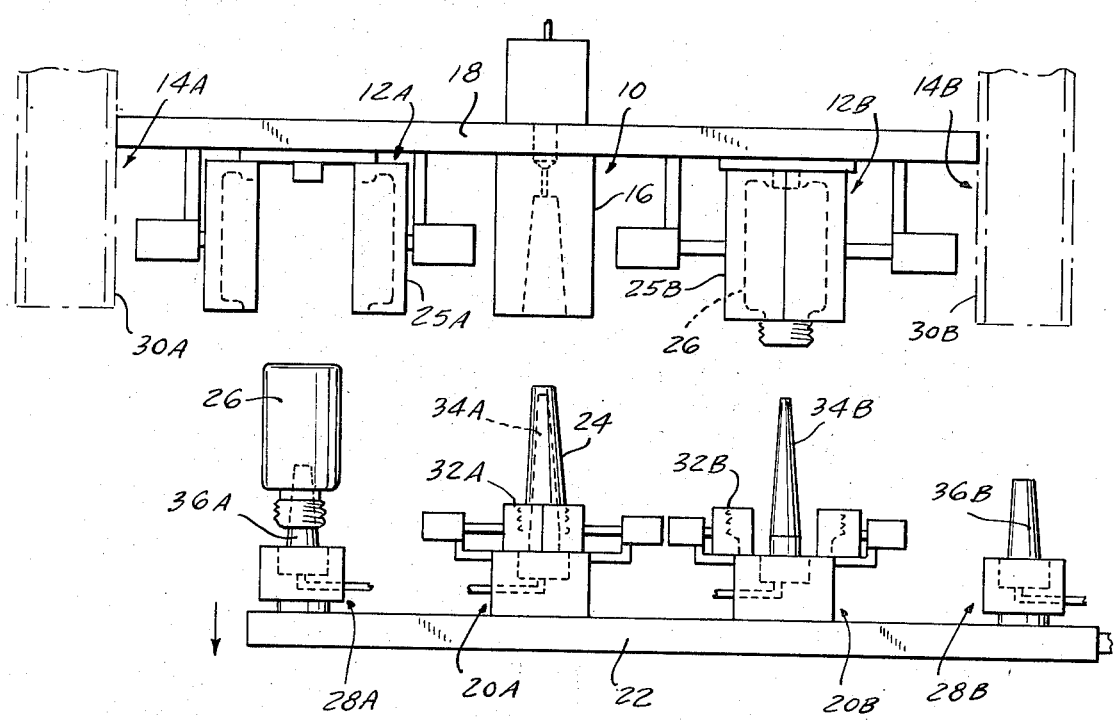
FIG. 4

LINEAR TRANSFER INJECTION BLOW MOLDING

REFERENCE TO RELATED APPLICATION

This application is related to injection blow molding method and apparatus of the general type disclosed in application Ser. No. 151,161 now U.S. Pat. No. 3,776,991, filed on June 30, 1971 for Injection Blow Molding Method and Apparatus.

SUMMARY OF THE INVENTION

The present invention relates to a method and apparatus for making hollow plastic articles such as containers or bottles by first injection molding a preform or parison, linearly transferring it to a blow molding station at which the parison is blown into the desired finished shape and while at this station the finished blown article is cooled, following which the article is transferred linearly to an ejection station for removal from the apparatus.

Another object is to provide an improved injection blow molding technique, including the steps of injection molding, blow molding, article cooling and article ejection which are separate and linearly related to one another, but adapted to operate simultaneously.

A further object is to provide a multiple station injection blow molding apparatus and method in which two sets of core rod assemblies index at prescribed stations sequentially with the first set cooperating in injection molding a parison and then blow molding into the selected conformation and the second set cooperating in cooling the blown article and thereafter transferring it to the ejection station.

Still another object is to provide a linear transfer injection blow molding machine and method employing two parison blow and plastic orient, two article blow and cool stations being fed alternatively from one injection station together with two article ejection stations for removing the finished article and transferring it to a desired location.

Other objects and advantages will become apparent from the following detailed description which is to be taken in conjunction with the accompanying drawings illustrating a somewhat preferred embodiment of the invention.

BRIEF DESCRIPTION OF THE DRAWINGS

In the drawings,

FIG. 3 is a similar plan view with the press closed after the core rod assembly supporting plate shifted linearly to the right to transfer a parison and cooled finished article to the blowing and ejection stations respectively and the two remaining core rod assemblies being transferred to cooperate in blow-cooling and parison injecting respectively;

FIG. 4 is a similar plan view with the press open following the step of FIG. 3 following which the apparatus and press particularly assumes the disposition shown in FIG. 1;

DETAILED DESCRIPTION

Figure 1:
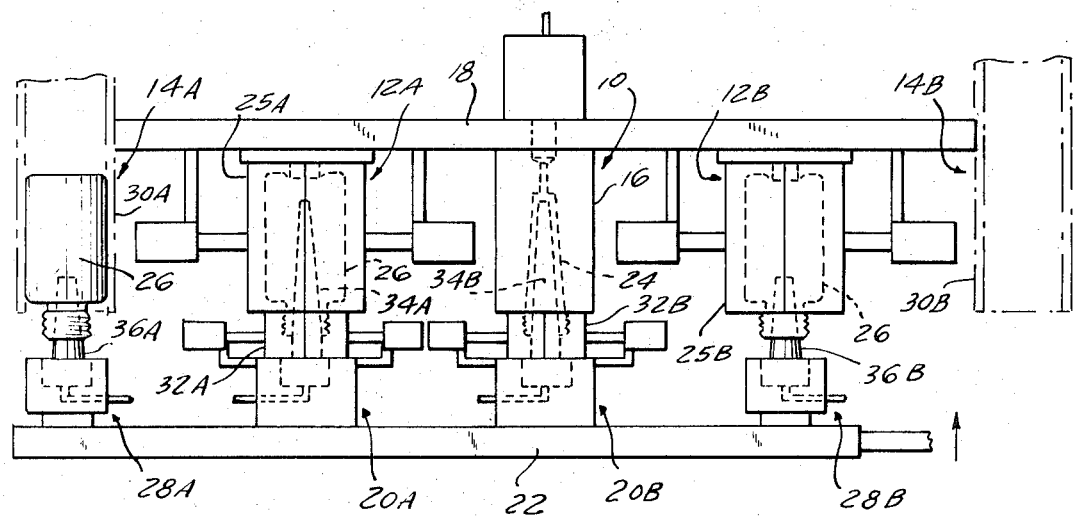
FIG. 1 is a top plan view of an injection blow molding apparatus of this invention showing the press in a closed or clamped position.

Referring initially to the embodiment of injection blow molding machine illustrated in FIGS. 1 to 6, a single row of in-line stations are present, namely, a preform or parison injection station 10, a pair of blow molding stations 12A and 12B on opposite sides of the parison injection station 10 and a pair of ejection stations 14A and 14B spaced outwardly from stations 12A and 12B, respectively. At the parison injection station 10, a parison mold 16 mounted on clamping plate 18 cooperates alternatively or sequentially with a pair of core rod assemblies 20A and 20B mounted on plate 22, in forming the parison 24. These core rod assemblies 20A and 20B are also adapted to couple with the blow molds 12A and 12B, respectively, in blow molding the receptacles 26. These receptacles 26 are cooled while in the molds 12A and 12B when coupled with the core rod assemblies 28A and 28B which are arranged in line with and on opposite sides of the core rod assemblies 20A and 20B. The cooled receptacles 26 are then transferred from the blow mold station to the ejection station at which a product removal mechanism 30A and 30B cooperates in removing the finished receptacle from the accommodating core rod assembly 28A and 28B, respectively. Although a single row of stations are illustrated in the drawings, it should be understood that multiple rows of such stations may be on the plates 18 and 20, not only in a horizontally disposed line as illustrated, but vertical as well; and similarly, the plates 18 and 22 could be horizontally disposed rather than being vertical as shown where desired or necessary. In the illustrated embodiment of FIGS. 1 to 6, clamping plate 18 is stationary whereas indexing plate 22 is reciprocal towards and away from plate 18 and is reciprocal in a plane parallel to the plane of plate 18. Mechanism 4 accomplishing this reciprocation is well known to the art and for this reason will neither be described nor illustrated. Obviously, clamping plate 18 may be reciprocal and plate 22 stationary or these plates may traverse any one or the other of the reciprocal movements.

Injection Station

The core rod assemblies 20A and 20B when aligned with the parison injection mold 16 form the injection station. In each cycle, one of the core rod assemblies is disposed within the cavity of the mold 16 for purposes of receiving the injected plastic shot employed in molding the parison 24. The core rod assemblies 20A and 20B may be essentially of the type disclosed in the above referenced patent application and may have associated therewith a one-piece or split neck mold 32A and 32B respectively. These neck molds will remain in a closed position except at such time as it is desired to disassociate the core assembly 20A or 20B from the blown article 26 so that the freed core assembly may be in a position to return to the parison injection station 10 to form another parison 24. In this instance, the core rod assemblies 20A and 20B include the core rod 34A and 34B which cooperates with the parison injection mold 16 and neck molds 32A and 32B in defining the shape of the parison 24.

Upon reciprocation of the indexing plate 22 and assuming the relative position of reciprocation as shown in FIG. 1, the parison mold 16 will be disposed about the core pin 34B into engagement with the closed neck mold 32B to define the parison forming cavity. The parison 24 is formed upon the injection into the cavity of the selected plastic melt under controlled pressure and temperature and with uniform density as explained in the above referenced patent application.

The mold 16 and particularly its cavity is carefully temperature controlled, electrically or by fluid (water or oil), in a manner well known to the art. In this connection, the mold 16 is at elevated temperatures whereas the split mold 32B is cooled to set the configuration of the neck as early as possible in the molding process. Core pin 34B is also heated either by means of liquid or electrical heat. In this manner, a skin is formed on the outer surfaces of the parison 24 and to a lesser degree on the inner surfaces thereof whereby the parison 24 is correctly "seasoned" in the parison mold 16 for blowing. For such purposes, the indexing plate 22 is retracted to the position shown in FIG. 2. Thereafter, the plate 18 reciprocates to the right to assume the relative disposition as illustrated in FIG. 3 prior to the forward reciprocation of plate 22.

Blow - Orient Station

The indexing plate 22 will reciprocate forwardly towards plate 18 to place the blow mold 12B about the parison 24 on core rod 34B and into engagement with the closed neck mold 32B as shown in FIG. 3 prior to blowing. When this occurs, air at high speeds and pressure enters the parison 24 and blows the plastic out to the blow cavity walls of mold 25B. This fast action stretches and orients the plastic. When the plastic comes in contact with the blow mold cavity walls, it starts to cool and assumes the form of the mold cavity. In this connection, the mold 25 is a split mold, the walls of which are cooled. Of course, in molding articles of a cylindrical nature, this mold may be of one-piece construction. On alternate cycles, this occurs between the core rod assembly 20A and the blow mold 12A. Upon completion of the blowing step, the split neck mold 32B will open and thereafter the indexing plate 22 will be retracted to the position shown in FIG. 4.

Blow - Cool Station

This station is constituted upon the alignment of the blow mold cavity 25B with the core rod assembly 28B as shown in FIG. 1 following the reciprocation to the left of plate 22 from the position shown in FIG. 4. Of course, another of such station, is presented when the blow mold 25A couples with the core rod assembly 28A. In each cycle, there is one core rod assembly 28A or 28B, as the case may be, or a set thereof, in the event more than one row or core rod assemblies are utilized, with its corresponding blow mold 25A or 25B or the corresponding set thereof.

The core rod assembly 28A and 28B are in most respects similar to core rod assemblies 20A and 20B except for the absence of split neck molds and the formation of the core rod 36A and 36B respectively, shorter in length and of a relatively soft material so that the necks of the blown article receptacles 26 are not damaged and that there is no heat transfer during the low cool step by the core rods 36A and 36B. In addition, materials of this nature facilitate the provision of an air bleed passage between the interior of the receptacle neck and the exterior surfaces of the core rod 36A and 36B. In a successful application of the present invention these core rods were formed of polyethylene.

During the blow-cool step, a constant stream of air at reduced pressure is passed over the inner surfaces of the receptacles 26. This air is permitted to bleed out between the receptacle neck and the core pin 36B. A blow-cool station of the foregoing type facilitates faster injection blow molding. Obviously, there are several other ways of obtaining this constant air flow and circulation for cooling the receptacle 26, all of which are intended to be embraced by the present invention.

Figure 2:
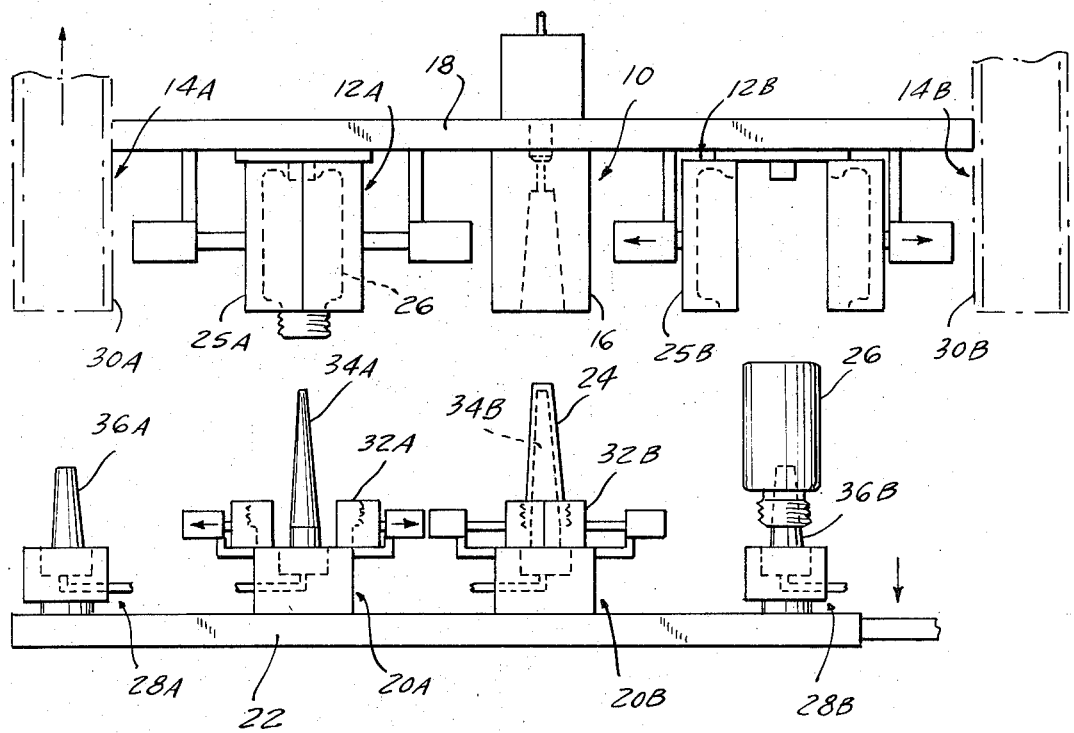
FIG. 2 is a similar top plan view of the press opened.
Figure 5:
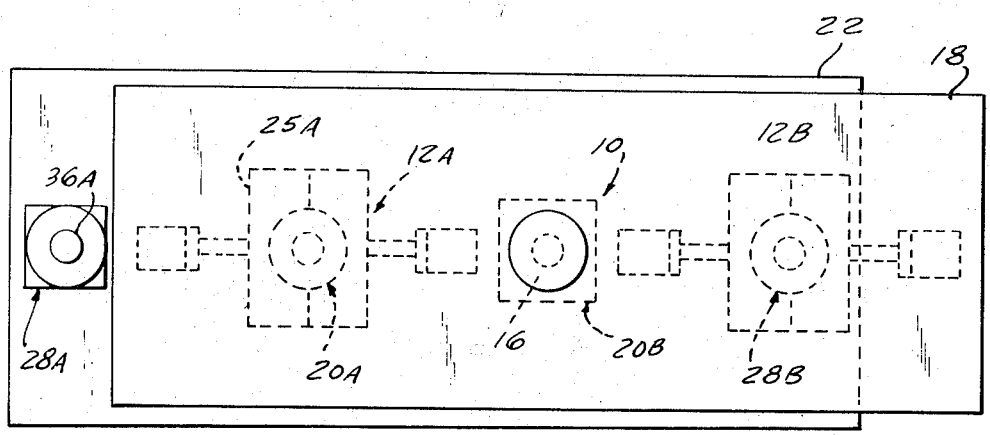
FIG. 5 is an elevational view of the apparatus disposed in the position shown in FIG. 1.
Figure 6:
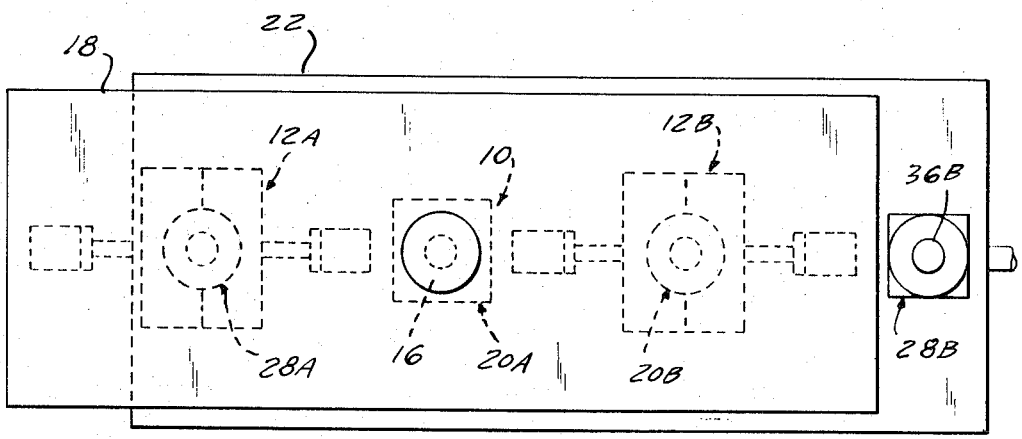
FIG. 6 is a similar elevational view of the apparatus disposed in the position shown in FIG. 3.

Immediately prior to the retraction of indexing plate 22, the split blow mold 25B opens and thereafter the cooled receptacle 26 will remain on the core rod 36B as shown in FIG. 2 for eventual transferral to the ejection station 14B.

Ejection Station

Upon the lateral reciprocation of plate 22, the core rod 36B with associated cooled receptacle 26 will be aligned with the product removal mechanism 30B. When the indexing plate 22 is shifted forwardly, the cooled receptacle 26 will be placed into association with the product removal means 30B which, in the illustrated embodiment, may assume the form of a suction tube which will withdraw the receptacle from the core rod 36B. In this connection, in each cycle, one set of these core rods 36A and 36B will deposit the receptacles in the ejection tubes while the other set are coupled with the blow mold 25A or 25B as the case may be for cooling the blown receptacles 26. In a successful application of the present invention, the cooled receptacles 26 were simply blown off of the core rod 36B into the tube 30B. Obviously, other receptacle stripping means may be employed, including mechanical devices where desired.

Summary of Operation

Briefly stated, plastic resin is initially injected into the cavity of the parison mold 16 and split neck mold 32B at the parison molding station 10 to form the parison 24. The press opens by the retraction of indexing plate 22 permitting the core rod assembly 20B to remove the parison 24 from the mold 16 in a manner shown in FIG. 2. The linear transfer mechanism is then actuated to cause the plate 22 to shift laterally to align core 34B with the cavity of the blow mold 25B at the blow molding station 12B. The press closes once again and air enters the parison 24 and forces the plastic to orient and form against the cavity walls of the split blow mold 25B. Once this has occurred, and the neck of the parison has cooled, the neck molds open and the press then opens, leaving the receptacle 26 in the blow mold cavity for further cooling as the press is opened in a manner shown in FIG. 4. The plate 22 is reciprocated to its other lateral position to align the core rod assembly 28B with the blow mold 25B and receptacle 26 therein. The press is closed and the core rod 36B enters the neck of the receptacle 26. Air is then blown through this core rod to cool the bottle 26. At the end of the cool cycle, which coincides with the ending of the blow-orient and injection cycles, the blow mold cavities open at blow molding station 26B. The press is once again opened and the cooled receptacle 26 is then transferred to the injection station 14B. Thus, during each cycle parisons are injected, parisons are oriented and blown, parisons are blown into final container forms and cooled, and the finished containers are ejected.

Thus, it will be evident to those skilled in the art that a linear transfer injection blow molding machine and process are provided by the instant invention which offers relatively fast, simple and accurate transfer of articles from station to station with cycle rates increased as the result of the cooling of the receptacle 26 by circulating air together with the separation of the orienting step from the cooling step. A further advantage is provided by the positive ejection at the ejection stations 14A and 14B which facilitate automatic handling and packing. Furthermore, the present invention also possesses the several advantages listed in the aforementioned patent application.

Figure 7:
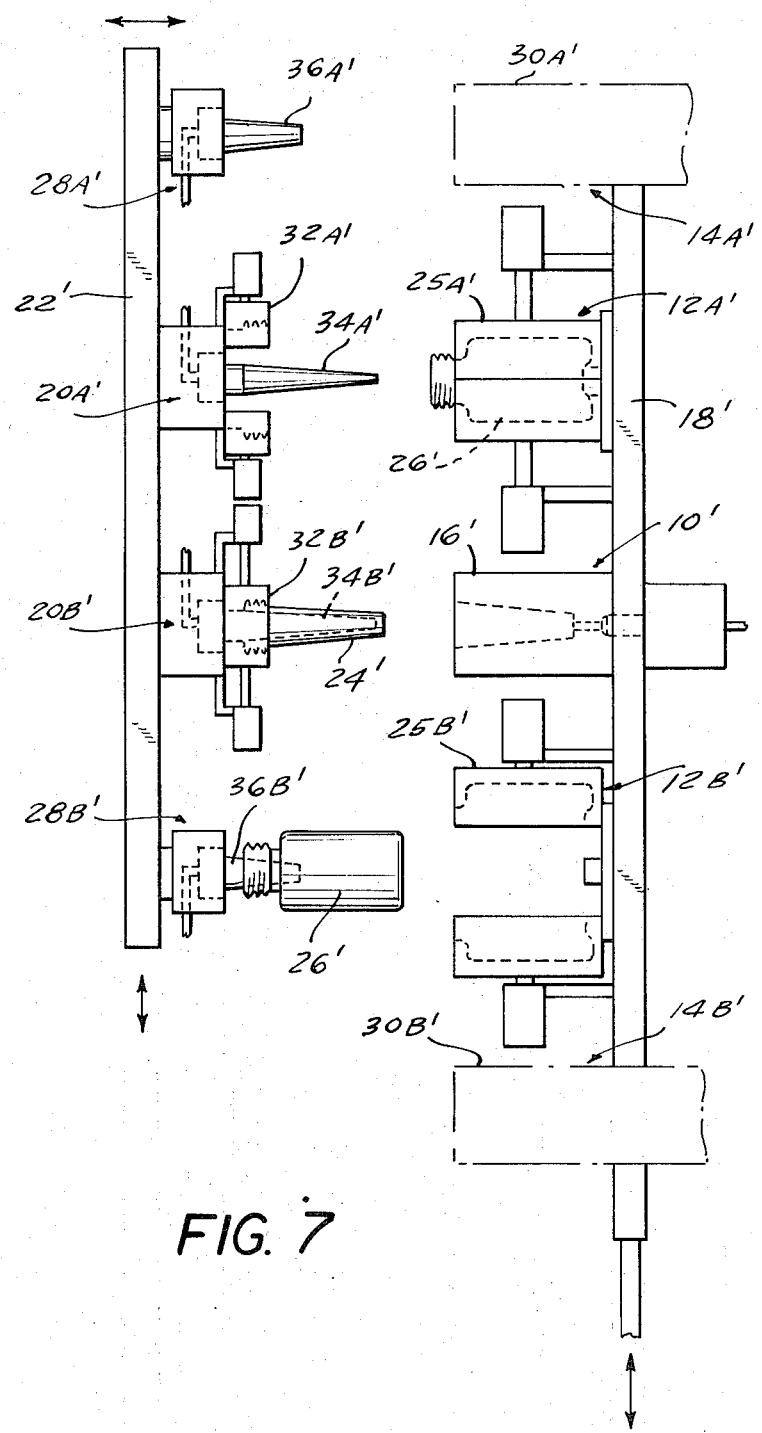
FIG. 7 is an end elevational view of an alternate embodiment of the invention with the core rod assemblies being on the clamping plate and reciprocal towards and away from the mold bearing plate and in a plane parallel thereto.

In FIG. 7, an alternative embodiment of the invention is illustrated depicting one of several arrangements of the several stations on the press which as indicated in the foregoing, may be arranged vertically or horizontally on either horizontal press plates or vertical press plates that are reciprocal towards and away and laterally with respect to one another. Similarly, the plate supporting the core rod assemblies may be reciprocal towards and away from the mold supporting plate rather than being laterally reciprocal as in the embodiment disclosed in detail herein with the other plate being laterally reciprocal as distinct from reciprocal towards and away from the core rod assemblies. With this in mind, the embodiment of FIG. 7 will be similarly numbered with accompanying primes to denote parts corresponding to those of the embodiment of FIGS. 1 to 6. For this reason, the construction and operation of the embodiment of FIG. 7 will not be described in detail at this juncture.

Although several somewhat preferred embodiments of the invention have been disclosed and described in detail herein, it should be understood that this invention is in no sense limited thereby and its scope is to be determined by that of the appended claims.

What is claimed is:

1. An injection blow molding apparatus for making plastic receptacles comprising:
   an injection station, including means at the injection station for injection molding a parison of selected configuration;
   a blowing station, including means at the blowing station for blow molding the parison into the selected finished product;
   an ejection station, product removing means at the ejection station for removing the finished product from the apparatus;
   means for transferring the parison along a first linear path away from the injection station then along a second linear path which is normal to said first path and then along a third path parallel to the first path to the blowing station wherein the finished product is simultaneously transferred from the blowing station to the ejection station along corresponding paths.

2. The invention in accordance with claim 1 wherein said injection molding means and blow molding means operate on parisons substantially simultaneously and means for transferring the parisons and finished product to the blowing station and ejection station substantially simultaneously.

3. The invention in accordance with claim 2 wherein the apparatus includes an in-line injection, blowing and ejection stations.

4. The invention in accordance with claim 3 wherein the apparatus includes two in-line stations having two ejection stations, two blowing stations and a common injection station.

5. The invention in accordance with claim 4 wherein a clamping plate and second plate are provided, the parison molding means at the injection station includes a parison mold mounted on said clamping plate, each of the blow molding means at the blowing stations include a blow mold mounted on the clamping plate in spaced relationship with a first blow mold on one side of the parison mold and the second blow mold being on opposite sides of the parison mold and in-line therewith, first and second in-line core rod assemblies mounted on said second plate and each of said assemblies including a core rod projecting laterally towards said clamping plate, each core rod adapted to sequentially couple with the parison mold in molding a parison and thereafter transfer the molded parison to the blow mold furthest away from the other core rod, the first core rod being coupled with the first blow mold for blow molding the parison on such core rod when the second core rod is coupled with the parison for injection molding a parison mold and the second core rod being coupled with the second blow mold for blow molding the parison on such core rod when the first core rod is coupled with the parison mold for injection molding a parison.

6. The invention in accordance with claim 5 wherein the first and second core rod assemblies are adapted to blow the associated parison into conformity with the wall of the associated blow mold and orient the stretched plastic parison, each of the product removing means at the ejection stations being mounted on the clamping plate with a first product removing means being on one side of the first blow mold away from the parison mold and the second product removing means being on the opposite side of the second blow mold away from the parison mold on opposite side of the spaced blow molds the product removing means being in-line with the blow molds, third and fourth in-line core rod assemblies for cooling the blown parison in the blow molds and being mounted on said second plate in-line with said first and second core rod assemblies and including a core rod projecting laterally towards said clamping plate, the third core rod adapted to couple with the first blow mold when the first core rod is coupled with the parison mold and adapted to transfer the blown parison to the first product removal station when the first core rod is coupled with the first blow mold, and the fourth core rod adapted to couple with second blow mold when the second core rod is coupled with the parison mold and adapted to transfer the blown parison to the second product removal station when the second core rod is coupled with the second blow mold.

7. The invention in accordance with claim 5 means are provided for reciprocating the second clamping plate towards and away from the clamping plate to couple the core rods with the molds and means are provided for laterally reciprocating the second plate to cooperate in transferring parisons to the associated blow molding station and the blown parison to the associated ejection station.

8. The invention in accordance with claim 1 wherein said injection station further includes a first core rod assembly and a second core rod assembly each having associated therewith a split neck mold for forming the neck of the container on the parison at the injection station, the neck mold being closed at the injection station and at the blow station and adapted to open prior to the uncoupling of the core rod assembly with the blow mold and thereafter close prior to coupling with the parison mold.

9. The invention in accordance with claim 8 wherein cooling means are provided for cooling the neck mold.

10. The invention in accordance with claim 1 wherein the parison blow molding means include means for introducing air internally of the injection molded parison.

11. The invention in accordance with claim 1 wherein the parison molding means is heated.

12. The invention in accordance with claim 5 wherein each of the blow molds includes a split mold which is closed and adapted to be opened when the third and fourth core assemblies transfer the blown parison to the ejection station.

13. The invention in accordance with claim 12 wherein the blow molds are cooled.

14. The invention in accordance with claim 6 wherein the third and fourth core rod assemblies comprise a relatively soft core rod, means for introducing air through the soft rod into the blown parison, and air bleed means to permit bleeding of the introduced air between the soft rods and the blown parison.

15. The invention in accordance with claim 6 wherein the first and second core rod assemblies are temperature controlled for optimum molding of the parison.

* * * * *